United States Patent
Echeverria et al.

(10) Patent No.: US 7,487,408 B2
(45) Date of Patent: Feb. 3, 2009

(54) DEFERRING ERROR REPORTING FOR A STORAGE DEVICE TO ALIGN WITH STAFFING LEVELS AT A SERVICE CENTER

(75) Inventors: Louis Daniel Echeverria, Tucson, AZ (US); Andrew Gary Hourselt, Tucson, AZ (US); John Thomas Olson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 11/117,913

(22) Filed: Apr. 29, 2005

(65) Prior Publication Data

US 2007/0005542 A1   Jan. 4, 2007

(51) Int. Cl.
*G06F 11/00* (2006.01)

(52) U.S. Cl. .................... 714/57; 714/48; 705/9
(58) Field of Classification Search ............... None
See application file for complete search history.

(56) References Cited

U.S. PATENT DOCUMENTS

| | | | | |
|---|---|---|---|---|
| 5,475,838 A * | 12/1995 | Fehskens et al. | ............. | 714/57 |
| 5,963,635 A * | 10/1999 | Szlam et al. | ............. | 379/309 |
| 6,401,079 B1 | 6/2002 | Kahn et al. | ............. | 705/30 |
| 6,446,136 B1 * | 9/2002 | Pohlmann et al. | ............. | 719/318 |
| 6,460,151 B1 * | 10/2002 | Warwick et al. | ............. | 714/718 |
| 6,829,568 B2 | 12/2004 | Julier et al. | ............. | 702/189 |
| 7,051,230 B2 * | 5/2006 | Olson | ............. | 714/2 |
| 7,203,930 B1 * | 4/2007 | Kirkpatrick et al. | ............. | 717/125 |
| 2001/0008554 A1 * | 7/2001 | Finnigan | ............. | 379/88.02 |
| 2001/0013109 A1 * | 8/2001 | Daimon et al. | ............. | 714/57 |
| 2002/0083168 A1 * | 6/2002 | Sweeney et al. | ............. | 709/224 |
| 2002/0091821 A1 * | 7/2002 | Katayama et al. | ............. | 709/224 |
| 2002/0091972 A1 * | 7/2002 | Harris et al. | ............. | 714/47 |
| 2002/0124213 A1 * | 9/2002 | Ahrens et al. | ............. | 714/57 |
| 2003/0084320 A1 | 5/2003 | Tarquini et al. | ............. | 713/200 |
| 2005/0044451 A1 * | 2/2005 | Fry et al. | ............. | 714/38 |
| 2006/0075025 A1 * | 4/2006 | Cheng et al. | ............. | 709/206 |

OTHER PUBLICATIONS

"Object Data Manager", IBM Technical Disclosure Bulletin, Mar. 1990, vol. 32, iss 10a, pp. 55-57.*

* cited by examiner

*Primary Examiner*—Gabriel L Chu
(74) *Attorney, Agent, or Firm*—Kunzler & McKenzie

(57) ABSTRACT

An apparatus, system, and method are disclosed for automatically maintaining a rule matrix. A download module downloads a rule. A destination module determines an intended storage device for the rule. A modification module modifies a rule matrix of the intended storage device with the rule.

11 Claims, 7 Drawing Sheets

DEFERRING ERROR REPORTING FOR A STORAGE DEVICE TO ALIGN WITH STAFFING LEVELS AT A SERVICE CENTER

BACKGROUND OF THE INVENTION

1. Field of the Invention

This invention relates to maintaining rules and more particularly relates to maintaining a rule matrix that regulates error reporting.

2. Description of the Related Art

A data storage system typically includes one or more storage devices. The storage devices may include magnetic tape drives, hard disk drives, optical storage devices, solid-state storage devices, and the like. Each storage device stores and retrieves data for one or more host systems such as mainframe computers, servers, network clients, and the like. The data storage system may include a controller that manages the storage devices.

A storage device may occasionally experience an error condition such as a read failure. The storage device may employ a rule to determine how to respond when the error condition occurs. For example, the rule may direct the storage device to execute a diagnostic data collection, backup, and/or recovery process in response to the error condition. The rule may also specify the time or manner that the error condition is reported. The storage device may store the rule in a rule matrix comprising one or more rules.

The data storage system may include a plurality of storage device types, models, and configurations. Each storage device may employ a rule matrix comprising rules targeted at the storage device's unique type, model, and configuration. For example, a hard disk drive rule matrix may include one or more rules distinct from the rule matrix of a magnetic tape drive.

One or more of the rules in the rule matrix may occasionally be modified to improve the diagnosis and detection of problems or optimize the reporting of problems. For example, rules may be modified to direct the storage device to report a first error condition immediately, report a second error condition during normal business hours, and to execute an extensive data collection process in response to a third error condition. Modifications to rule matrices may be made from the controller. In addition, modifications may be made from a remote service center. The service center may monitor the data storage system, receive error reports, and perform maintenance functions. In one embodiment, the service center monitors and maintains a plurality of data storage systems.

Unfortunately, modifications to rule matrices are generally manual processes, and so are prone to errors. Making the modifications may also require a skilled operator to modify the rule matrices for hundreds of storage devices, increasing the time and expense required for modifications. In addition, manually modifying rules for each type, model, and configuration of storage device can be time consuming. The operator typically directs appropriate rule modifications to each type, model, and configuration of storage device from the controller or service center. The operator may also be required to determine that a rule modification is appropriate for each storage device in the data storage system. As a result, rule matrix modifications can be expensive and prone to errors.

From the foregoing discussion, it should be apparent that a need exists for an apparatus, system, and method that automatically maintain a rule matrix. Beneficially, such an apparatus, system, and method would automate the downloading of rules, the direction of rules to storage devices, and the modification of storage device rule matrices.

SUMMARY OF THE INVENTION

The present invention has been developed in response to the present state of the art, and in particular, in response to the problems and needs in the art that have not yet been fully solved by currently available rule maintenance methods. Accordingly, the present invention has been developed to provide an apparatus, system, and method for automatically maintaining a rule matrix that overcome many or all of the above-discussed shortcomings in the art.

The apparatus to automatically maintain a rule matrix is provided with a logic unit containing a plurality of modules configured to functionally execute the necessary steps of downloading a rule, determining an intended storage device, and modifying a rule matrix. These modules in the described embodiments include a download module, a destination module, and a modification module.

The download module downloads a rule. The rule regulates error reporting for a storage device. In one embodiment, the rule is an error rule that directs the execution of a data collection process in response to an error condition. For example, the error rule may direct the saving of write data prepared for storage immediately prior to an error condition to an error log file. The rule may also comprise a deferral rule that directs when an error condition is reported. For example, the deferral rule may direct the deferral of reporting the error condition until during regular business hours.

The destination module determines an intended storage device for the rule. For example, the destination module may determine that the rule is intended for one or more first storage devices such as one or more magnetic tape drives with a common type, model, and configuration. In an alternate embodiment, the destination module may determine each storage device for which the rule is valid. For example, the destination module may determine that the rule is valid for, and intended for, one or more hard disk drives and one or more optical storage devices.

The modification module modifies a rule matrix of the intended storage device with the rule. In one embodiment, the modification module appends the rule to the storage device's rule matrix. In an alternate embodiment, the modification module removes the rule from the storage device's rule matrix. In a certain embodiment, the modification module appends one or more rules and removes one or more rules. The apparatus automatically maintains the rule matrix, modifying the intended storage device's rule matrix with the appropriate rule.

A system of the present invention is also presented to automatically maintain a rule matrix. The system may be embodied in a data storage system. In particular, the system, in one embodiment, includes a storage device and a controller. The system may also include a service center.

The storage device stores and retrieves data. For example, the storage device may be a magnetic tape drive, hard disk drive, optical storage device, solid state storage device, and the like. The controller manages the storage device. For example, the controller may manage bringing storage devices on-line, taking storage devices off-line, and performing diagnostic functions.

In one embodiment, the controller includes a communication module. The controller may communicate with the service center through the communication module. The service center may monitor and maintain the controller and the storage device remotely. For example, the service center may schedule service calls and storage device replacements.

The controller includes a download module, a destination module, and a modification module. The download module downloads one or more rules. In one embodiment, the download module downloads the rule through the communication module from the service center. The destination module determines an intended storage device for the rule. The modification module modifies a rule matrix of the intended storage device with the rule. The system automatically maintains the rule matrix of the storage device.

A method of the present invention is also presented for automatically maintaining a rule matrix. The method in the disclosed embodiments substantially includes the steps necessary to carry out the functions presented above with respect to the operation of the described apparatus and system. In one embodiment, the method includes downloading a rule, determining an intended storage device, and modifying a rule matrix.

A download module downloads a rule. In one embodiment, the rule is configured as an object data manager ("ODM") object. The rule may comprise an error rule. In addition, the rule may comprise a deferral rule. A destination module determines an intended storage device for the rule. A modification module modifies a rule matrix of the intended storage device with the rule.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The apparatus, system, and method automatically maintain a rule matrix by determining the intended storage device for a downloaded rule and modifying the storage device's rule matrix with the rule. In addition, the apparatus, system, and method may maintain a rule matrix comprising error rules and/or deferral rules. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
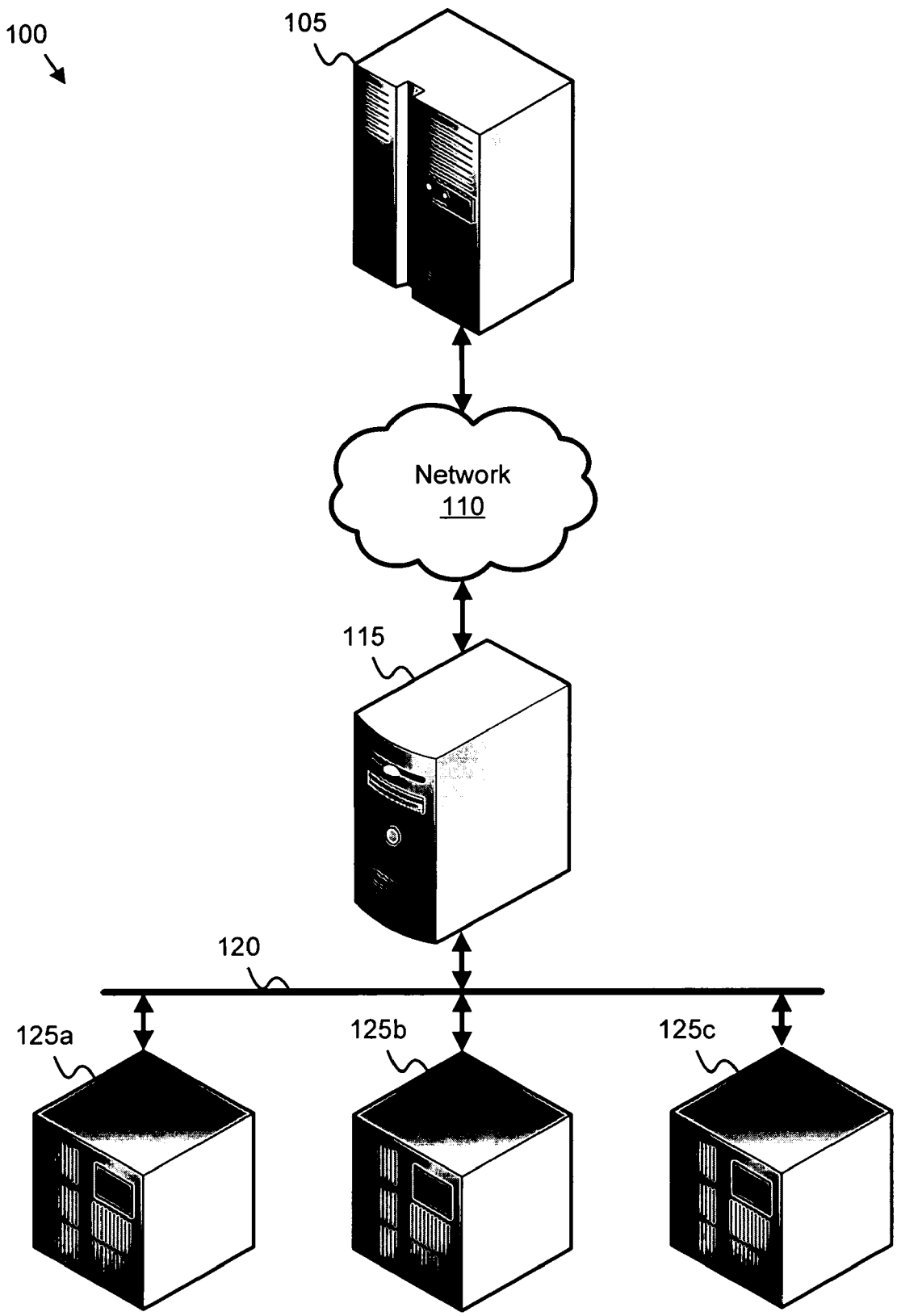
FIG. 1 is a schematic block diagram illustrating one embodiment of a data storage system in accordance with the present invention.

FIG. 1 is a schematic block diagram illustrating one embodiment of a data storage system 100 in accordance with the present invention. The system 100 includes a service center 105, a network 110, a controller 115, a storage system network 120, and one or more storage devices 125. Although the system 100 is depicted with one service center 105, one controller 115, and three storage devices 125, any number of service centers 105, controllers 115, and storage devices 125 may be employed. In one embodiment, the system 100 comprises the IBM 3584 UltraScalable Tape Library manufactured by International Business Machines ("IBM") of Armonk, N.Y.

The storage device 125 stores and retrieves data. For example, the storage device 125 may be a magnetic tape drive, hard disk drive, optical storage device, solid state storage device, and the like. Each storage device 125 is configured to detect an error condition. Error conditions may include read errors, write errors, data transmission errors, and the like. For example, the storage device 125 may detect an error condition when a calculated check sum for a read block of data is inconsistent with a recorded check sum for the data.

One or more rules regulate error reporting for the storage device 125. In one embodiment, the rule is an error rule. The error rule may direct the execution of one or more processes such as a data collection process in response to an error condition. For example, an error rule may direct the saving of write data prepared for storage immediately prior to an error condition to an error log file. The error rule may also specify the saving to the error log of one or more parameters, condition codes, and the like.

The rule may also comprise a deferral rule that directs when an error condition is reported. For example, an error condition indicative of a storage device failure may require a prompt report, while an error condition indicative of normal wear may only require a report during a regularly scheduled communication or during normal business hours. The deferral rule may direct when the error condition is reported to enable a response that is both efficient and timely. For example, deferring a report for a routine error condition allows the error condition to be analyzed and dealt with along with other error conditions of the data storage system 100 for increased efficiency. The rules may comprise error rules, deferral rules, or a combination of these.

The controller 115 manages each storage device 125, communicating with the storage devices 125a-c through the storage system network 120. The storage system network 120 may be an Ethernet network, one or more Fibre Channel communication channels, or the like as is well known to those skilled in the art. In one embodiment, the controller 115 is configured as a center-of-room device, managing the plurality of storage devices 125 in the data storage system 100. For example, the controller 115 may manage bringing storage devices 125 on-line, taking storage devices 125 off-line, migrating data between storage volumes, initializing storage volumes, modifying firmware, performing diagnostic functions, and the like.

The service center 105 may monitor and maintain the controller 115 and the storage device 125 remotely. In one embodiment, the service center 105 communicates with the controller 115 through the network 110. The network 110 may be the Internet, a dedicated data connection, or the like. The service center 105 collects data on error conditions and performance for each storage device 125 in the system 100. In a certain embodiment, the service center 105 includes automated devices and operators that may analyze error condition data, forecast storage device 125 failures, schedule maintenance processes, schedule service calls, and arrange for storage device 125 replacements.

Although the service center 105 may receive error condition reports and initiate service at any time, the service center 105 may respond more cost effectively to reports received at specified times. For example, the service center 105 may be fully staffed and able to respond most efficiently during normal business hours. The service center 105 may reduce costs by only receiving critical error condition reports during times other than normal business hours. One or more deferral rules stored in a rule matrix of the storage device 125 determine when an error condition is reported such as to the service center 105, increasing the efficiency of service and maintenance operations. Alternatively, the deferral rules may be stored in the controller 115.

The service center 105 or an operator using the controller 115 may also respond efficiently to error condition reports when the reports include sufficient information to analyze and diagnosis a cause of the error. One or more error rules stored in the rule matrix of the storage device 125 may direct the collection of appropriate information so that errors may be efficiently analyzed. For example, an error rule may direct that a storage device's 125 signal strength data be saved to an error log file when the storage device 125 detects a read error condition.

Rules stored in one or more rule matrices of one or more storage devices 125 may be modified to increase the efficiency and efficacy of maintenance operations. For example, a service center 105 may create new or modified rules for one or more storage devices 125 to change error detection thresholds. Unfortunately, operators including service center 105 personnel typically must manually target rule modifications to specific storage devices 125 or to specific types, models, and configurations of storage devices 125, increasing the cost and difficulty of maintaining rule matrices. The system 100 automatically downloads a rule, determines an intended storage device 125 for the rule, and modifies the rule matrix of the storage device 125 based on the rule to increase the ease, speed, and reliability of rule matrix modifications.

Figure 2:
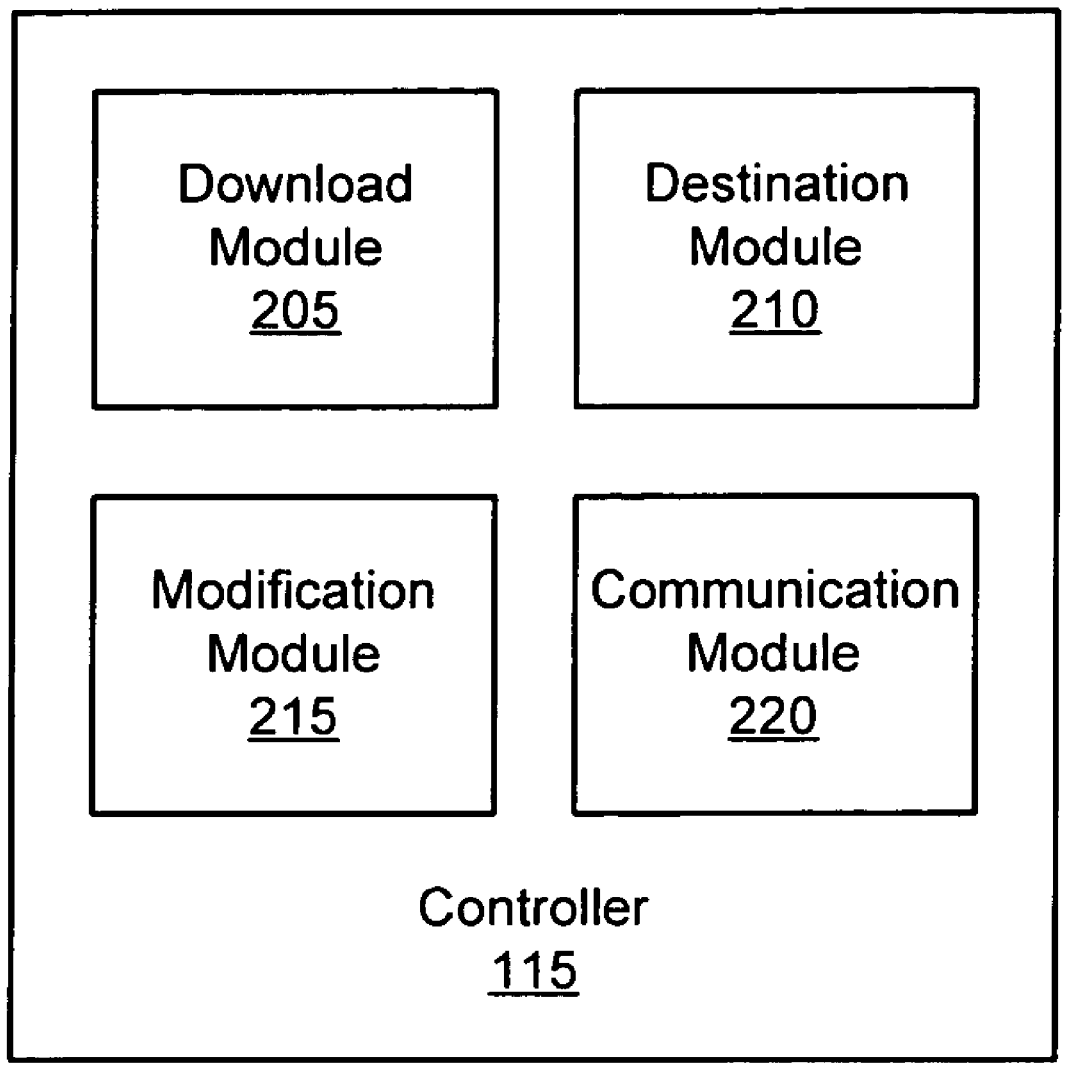
FIG. 2 is a schematic block diagram illustrating one embodiment of a controller of the present invention.

FIG. 2 is a schematic block diagram illustrating one embodiment of a controller 115 of the present invention. The controller 115 is the controller 115 depicted in FIG. 1. In the depicted embodiment, the controller 115 includes a download module 205, a destination module 210, and a modification module 215. In one embodiment, the controller 115 further includes a communication module 220. The communication module 220 may communicate with one or more storage devices 125 through a storage system network 120 such as depicted in FIG. 1. In addition, the communication module 220 may communicate with a service center 105 through a network 110.

The download module 205 downloads a rule for regulating error reporting for a storage device 125. In one embodiment, the download module 205 downloads the rule from a service center 105. The download module 205 may regularly check for a rule to download from the service center 105. An operator or the service center 105 may direct the download module 205 where to check for the rule. For example, the download module 205 may check for a rule to download every four hours at a logical network address provided by the service center 105. The service center 105 may also transmit a rule and the download module 205 download the rule as the rule is transmitted.

In a certain embodiment, the service center 105 notifies the download module 205 that a rule is available for download at a specified time. For example, the service center 105 may notify the download module 205 that a rule is scheduled to be available for download at three o'clock in the morning. Alternatively, the download module 205 may download or transfer the rule from removable storage media provided by an operator. The operator may also direct the download module 205 to check for a downloadable rule from the service center 105.

The rule may include data specifying an intended storage device 125 such as type, model, and characteristic data. For example, the rule may include data specifying a model of magnetic tape drive. In a certain embodiment, the rule may be an error rule. The rule may also be a deferral rule.

The destination module 210 determines an intended storage device 125 for the rule. In one embodiment, the destination module 210 determines the intended storage device 125 from one or more characteristics of the rule. For example, the destination module 210 may determine that a rule for a striping error condition is intended for a redundant array of independent disks ("RAID") hard disk drive storage device 125.

The destination module 210 may also determine the intended storage device 125 from type, model, and characteristic data included with the rule. For example, the destination module 210 may determine that the rule is intended for one or more one or more magnetic tape drives with a type, model, and configuration matching the type, model, and configuration data included with the rule. Of course a match may be made using one or more of the type, model, and characteristic data.

In an alternate embodiment, the destination module 210 may determine each storage device 125 for which the rule is valid. For example, the destination module 210 may determine that the rule is intended for one or more hard disk drive storage devices 125 and one or more optical storage devices 125 where the rule is valid for each hard disk drive storage device 125 and each optical storage device 125. A valid rule is a rule applicable to a particular type, model, or configuration of storage device 125.

The modification module 215 modifies a rule matrix of the intended storage device 125 with the rule. The rule matrix may be stored on the storage device 125. In one embodiment, the rule matrix is stored in addressable memory such as static random access memory ("SRAM"), dynamic random access memory ("DRAM"), flash random access memory ("Flash RAM"), and the like. In an alternate embodiment, the rule matrix is stored on a storage media such as the magnetic tape of a magnetic tape drive storage device 125 or the hard disk of a hard disk drive storage device 125.

In one embodiment, the rule matrix comprises an error rule matrix that includes one or more error rules. The rule matrix may also comprise a deferral rule matrix including one or more deferral rules. In a certain embodiment, the rule matrix comprises both error rules and deferral rules. Each rule in the rule matrix may include a data field that indicates the rule's type, such as error rule, deferral rule, or the like.

In one embodiment, the rule matrix is organized as a matrix with one or more hierarchies. For example, the rule matrix may be organized by error type, error severity, or the like. In a certain embodiment, one or more instances of a rule may occur in the rule matrix, each organized by a unique hierarchical variable. In an alternate embodiment, the rule matrix is organized as a linked array, with each element of the array comprising a rule. The rule matrix may also be organized as a delimited list, with each list element comprising a rule.

In one embodiment, the modification module 215 appends the rule to the storage device's 125 rule matrix. The modification module 215 may append the rule to the rule matrix such that the rule is organized in a rule matrix hierarchy. In an alternate embodiment, the modification module 215 appends the rule to a linked array by storing the rule array and writing a pointer to the rule array in another element of the linked array. In a certain embodiment, the rule includes a data field containing a value that indicates the rule should be appended to the rule matrix. The data field value may also indicate how the rule is appended, such as by appending the rule after the last delimiter in a list of rules.

The modification module 215 may also remove the rule from the storage device's 125 rule matrix. In one embodiment, the modification module 215 deletes the rule from one or more hierarchical positions in the rule matrix. In an alternate embodiment, the modification module 215 deletes a pointer to an array comprising the rule in an element of a linked array and deletes the rule array. In a certain embodiment, the rule includes a data field containing a value that indicates the rule should be removed to the rule matrix. The data field value may also indicate how the rule is removed, such as by deleting a delimited line in a list containing a rule identical to the rule.

In a certain embodiment, the modification module 215 appends one or more rules and removes one or more rules. The modification module 215 may update the rule matrix by removing a first instance of a rule and appending a second updated instance of the rule. The controller 115 automatically maintains the rule matrix, modifying a storage device's 125 rule matrix with the appropriate rule.

Figure 3:
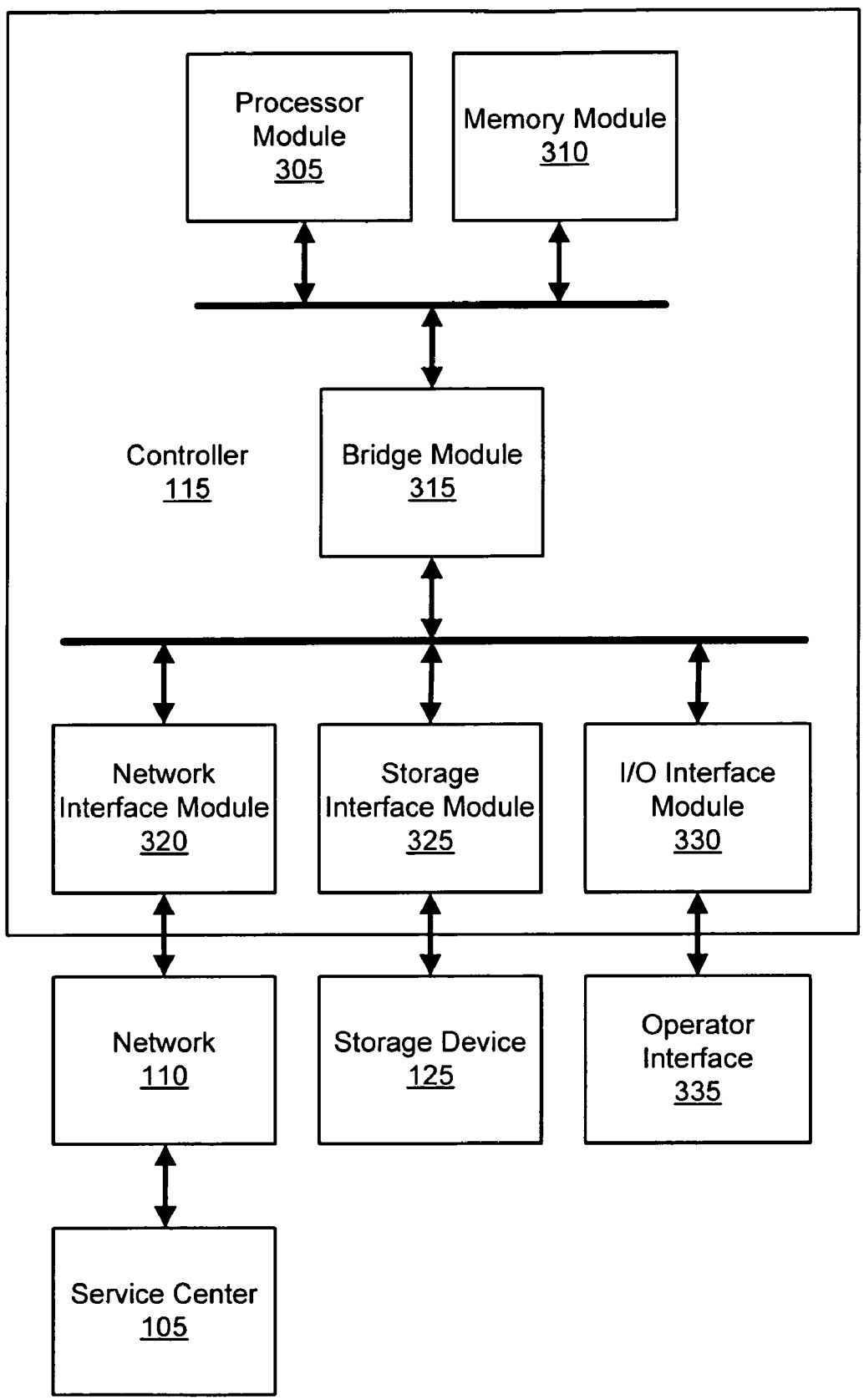
FIG. 3 is a schematic block diagram illustrating one alternate embodiment of a controller of the present invention.

FIG. 3 is a schematic block diagram illustrating one alternate embodiment of a controller 115 in accordance with the present invention. The depicted controller 115 may be one embodiment of the controller 115 of FIG. 1. The controller 115 includes a processor module 305, a memory module 310, a bridge module 315, a network interface module 320, a storage interface module 325, and an input/output ("I/O") interface module 330. The controller 115 is depicted in communication with a network 110, a service center 105, a storage device 125, and an operator interface 335. The network 110, service center 105, and storage device 125 may be the network 110, service center 105, and storage device 125 of FIG. 1.

The processor module 305, memory module 310, bridge module 315, network interface module 320, storage interface module 325, and I/O interface module 330 may be fabricated of semiconductor gates on one or more semiconductor substrates. Each semiconductor substrate may be packaged in one or more semiconductor devices mounted on circuit cards. Connections between the processor module 305, the memory module 310, the bridge module 315, the network interface module 320, the storage interface module 325, and the I/O interface module 330 may be through semiconductor metal layers, substrate to substrate wiring, or circuit card traces or wires connecting the semiconductor devices.

The memory module 310 stores software instructions and data including software instructions and data that comprise the download module 205, destination module 210, and modification module 215 of FIG. 2. The processor module 305 executes the software instructions including the download module 205, destination module 210, and modification module 215, and manipulates the data as is well know to those skilled in the art.

The processor module 305 communicates with the network interface module 320, the storage interface module 325, and the I/O interface module 330 through the bridge module 315. In one embodiment, the network interface module 320, the storage interface module 325, and the I/O interface module 330 comprise the communication module 220 of FIG. 2. The network interface module 320 may be an Ethernet interface and connect with the network 110 over an Ethernet connection. The network 110 may comprise an Ethernet interface and a router that communicates with the service center 105 over an Internet connection as is well known to those skilled in the art.

In one embodiment, the storage interface module 325 is a Fibre Channel interface. The Fibre Channel interface may communicate with one or more storage devices 125, although for simplicity the storage interface module 325 is depicted in communication with one storage device 125. In a certain embodiment, the I/O interface module 330 comprises a universal serial bus ("USB") interface. The USB interface may communicate with the operator interface 335 comprising a USB compatible keyboard, mouse, and the like. The I/O interface module 330 may also comprise a graphics module and communicate with a display comprised by the operator interface 335.

The processor module 305 may communicate with the service center 105 through the network interface module 320. In one embodiment, the processor module 305 downloads a rule from the service center 105 through the network interface module 325. In an alternate embodiment, the processor module 305 receives the rule from an operator through the operator interface 335 and the I/O interface module 330.

The processor module 305 determines an intended storage device 125 for the rule and modifies the rule matrix of the storage device 125 through the storage interface module 325. The controller 115 automatically modifies the rule matrix of the storage device 125.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
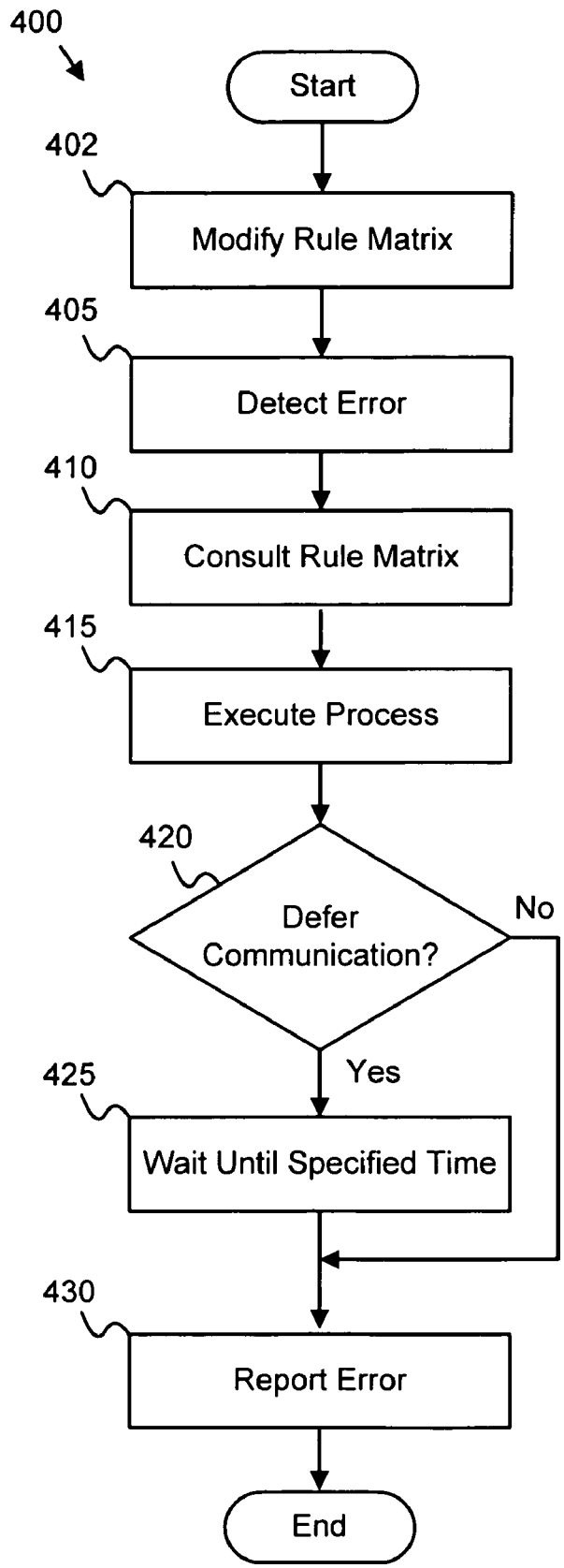
FIG. 4 is a schematic flow chart diagram illustrating one embodiment of an error reporting method in accordance with the present invention.

FIG. 4 is a schematic flow chart diagram illustrating one embodiment of an error reporting method 400 in accordance with the present invention. A storage device 125 of FIG. 1 may employ the method 400 in reporting an error condition. The method 400 begins and the controller 115 of FIGS. 1 and 2 modifies 402 a rule matrix. In one embodiment, the rule matrix resides on the storage device 125. For example, the storage device 125 may store the rule matrix in an internal memory module such as a Flash RAM module or the like. Alternatively, the controller 115 may store the rule matrix such as in the memory module 310 of FIG. 3.

In one embodiment, the controller 115 modifies 402 the rule matrix in response to a directive from a service center 105 such as the service center 105 of FIG. 1. For example, an operator at the service center 105 may determine that the rule matrix should be modified for all storage devices of a specific type, model or configuration. In response to the operator's direction, the service center 105 may direct the modification of the rule matrix for the specified type, model, or configuration of storage devices 125 by communicating the modifications to one or more controllers 115.

In a certain embodiment, the service center 105 directs the modification of the rule matrix as part of a maintenance operation. For example, the service center 105 may direct the controller 115 to modify the rule matrices for storage devices 125 at a data storage facility to gather more detailed information on storage device 125 function prior to a service call. The detailed information may be used to identify maintenance operations that should be performed on one or more storage devices 125 such as component replacement.

In one embodiment, the service center 105 directs the modification of the rule matrix on regular schedule. For example, the service center 105 may direct the modification of the rule matrix with the change of each service center 105 operator work shift to align the rule matrix with the staffing levels at the service center 105. In an alternate embodiment, the controller 115 modifies 402 the rule matrix in response to a directive from an operator. For example, the operator may direct the controller 115 to modify 402 the rule matrix for a plurality of storage devices 125 in the data storage facility.

The storage device 125 detects 405 an error condition such as a write error or a read error. In addition, the storage device 125 consults 410 a rule matrix. The rule matrix comprises one or more rules regulating data collection, error reporting, and the like. In one embodiment, the rule matrix includes one or more error rules and one or more deferral rules. In an alternate embodiment, the storage device 125 contains one or more error rule matrices and one or more deferral rule matrices, and the storage device 125 may consult 410 at least one of the plurality of rule matrices.

The rule matrix may contain one or more rules corresponding to the detected error condition. The storage device 125 consults 410 the rules corresponding to the detected error condition. In one embodiment, the storage device 125 searches a rule matrix searching for a rule matching the error condition. In a certain embodiment, the storage device 125 executes 415 a process such as a data collection process as directed by an error rule corresponding to the error condition. For example, the error rule may direct the storage device 125 to collect storage device 125 state data from when the error condition occurred. The state data may include the physical location of the error condition on a storage media, whether the error was correctable or uncorrectable, a date stamp for the error condition, a date stamp from when the data was written, and the like.

The storage device 125 may further determine 420 whether to defer communication of the error condition responsive to one or more deferral rules. For example, a deferral rule corresponding to a recoverable read error condition may direct the storage device 125 to defer error reporting until a regularly scheduled status report while a deferral rule for a unrecoverable read error may direct the storage device 125 to report the error condition immediately.

If the storage device 125 determines 420 to defer error reporting, the storage device 125 waits 425 until a specified time to report the error. For example, the storage device 125 may wait until the normal business hours of a service center 105 before reporting 430 the error. If the storage device 125 determines 420 not to defer the error report, the storage device 125 may immediately report 430 the error. The method 400 may then terminate. The method 400 allows the storage device 125 to report error conditions as regulated by one or more rules of a rule matrix.

Figure 5:
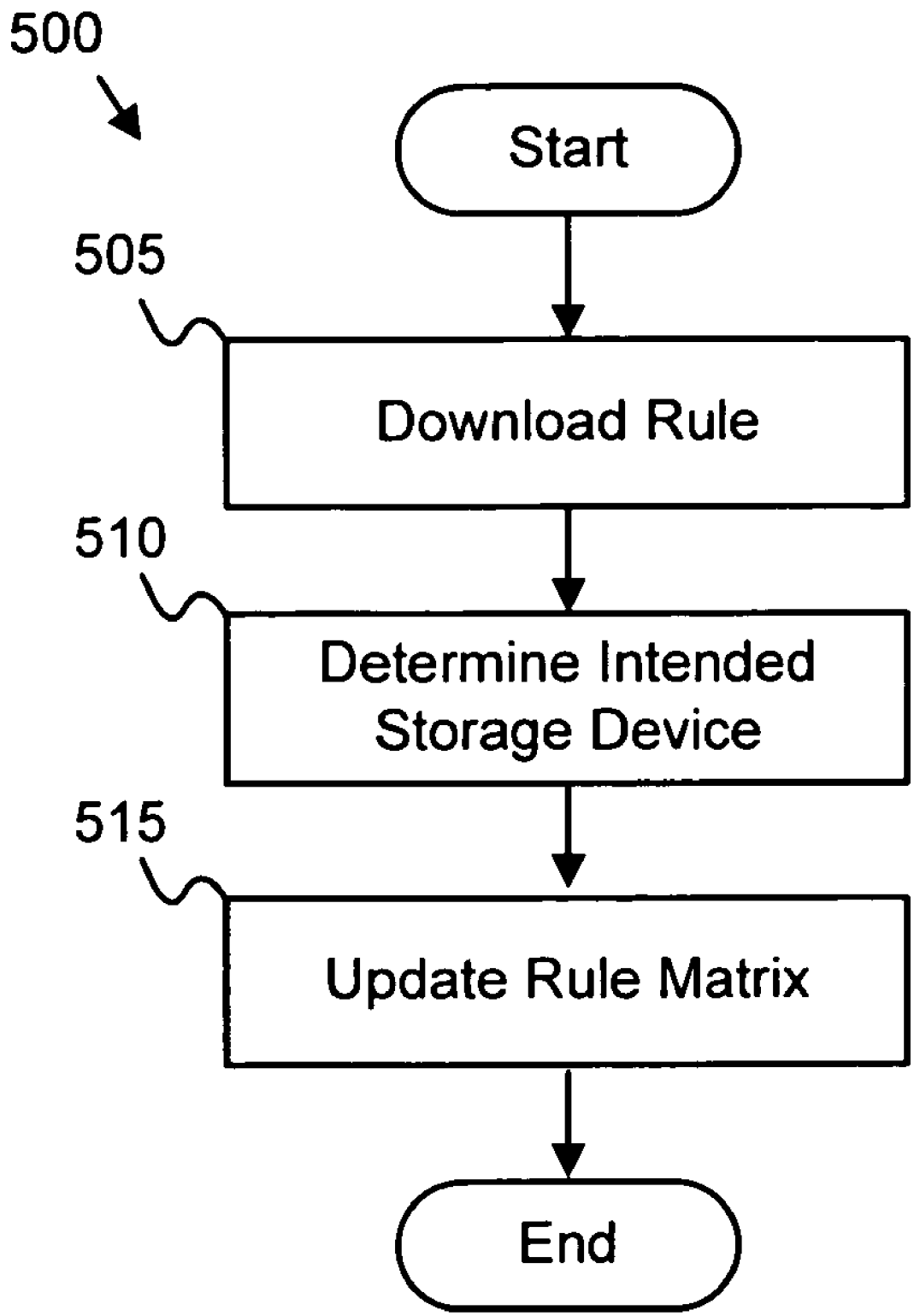
FIG. 5 is a schematic flow chart diagram illustrating one embodiment of a rule matrix modification method of the present invention.

FIG. 5 is a schematic flow chart diagram 500 illustrating one embodiment of a rule matrix modification method 500 of the present invention. The method 500 as depicted substantially includes the steps necessary to carry out the functions presented with respect to the operation of the system 100 of FIG. 1 and the controller 115 of FIGS. 2 and 3. In one embodiment, the method 500 is the modify rule matrix step 402 of FIG. 4.

A download module 205 downloads 505 a rule for regulating error reporting for a storage device 125. In one embodiment, the rule is configured as an object data manager ("ODM") object. The ODM object is a software data structure that includes attribute information describing related devices, data structures, and processes. For example, each rule may comprise one or more ODM objects from one or more ODM object classes. A first ODM object may comprise device identification information. For example, the first ODM object may comprise data specifying the type, model, and configuration for a storage device 125. The rule may be configured as an error rule or as a deferral rule.

In one embodiment, the download module 205 downloads 505 the rule from a service center 105. The service center 105 may transmit the rule to one or more data storage systems 100 during a periodic maintenance operation. The download module 205 may also request the download 505. In an alternate embodiment, the download module 205 receives the rule from an operator input such as through the operator interface 335 of FIG. 3.

Next, a destination module 210 determines 510 an intended storage device 125 for the rule. In one embodiment, the destination module 210 determines 510 the intended storage device from an ODM object of the rule that specifies the storage device 125. In an alternate embodiment, the ODM object specifies types, models, and configurations common to one or more storage devices 125, and the destination module 210 determines 510 each storage device 125 comprising the specified type, model, and configuration as the intended storage device 125.

A modification module 215 modifies 515 a rule matrix of the intended storage device 125 with the rule. In one embodiment, the modification module 215 modifies 515 the rule matrix by appending the rule to the rule matrix. For example, the rule matrix may comprise one or more rules. Each rule may be an ODM object of the same ODM object class. The modification module 215 may append a rule of that same ODM object class to the rule matrix. In one embodiment, each rule includes a data value containing a value indicating if the modification module 215 should modify 215 the rule matrix by removing the rule, appending the rule, or updating the rule. For example, the data field may indicate that the matrix module 215 should append the rule to a linked array comprising the rule matrix.

The modification module 215 may also modify 515 the rule matrix with the rule by removing the rule from the rule matrix. For example, the modification module 215 may read each rule in the rule matrix and identify one or more rules that are identical to a downloaded rule with a removal value in the data field. The modification module 215 may then modify 515 the rule matrix by deleting the identified rules from the rule matrix. In a certain embodiment, the modification module 215 modifies 515 the rule matrix by updating a first instance of rule with a second instance of the rule wherein the second instance is included in a downloaded rule with an update value in the data field. The method 500 then terminates. As depicted, the method 500 automatically modifies the rule matrix, improving the efficiency and accuracy of rule matrix modifications.

Figure 6:
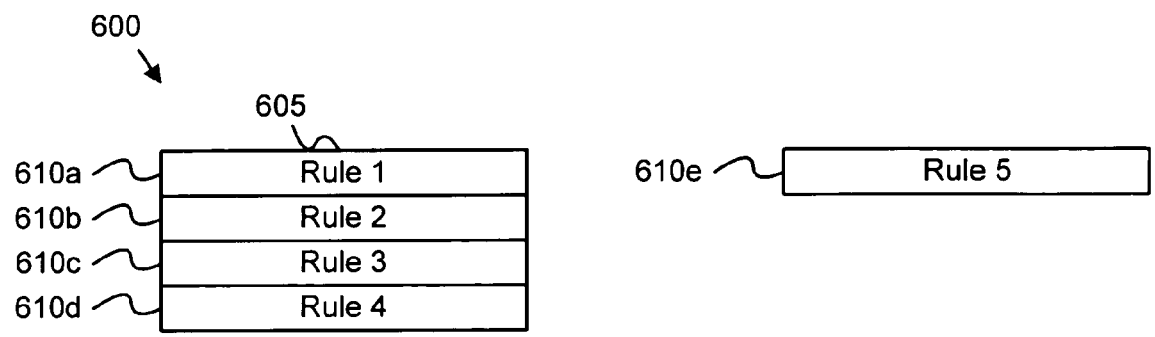
FIG. 6 is a schematic block diagram illustrating appending a rule in accordance with one embodiment of the present invention.

FIG. 6 is a schematic block diagram illustrating one embodiment of appending a rule 600 according to one embodiment of the present invention. In one embodiment, a rule matrix 605 may reside on a storage device 125 such as the storage device 125 of FIG. 1. In an alternate embodiment, the rule matrix 605 resides on a controller 115 such as the controller 115 of FIG. 1 and is distinguished by an identifier specific to the storage device 125.

The rule matrix 605 is depicted as a plurality of rules, rule 1 610a, rule 2 610b, rule 3 610c, and rule 4 610d. Although for simplicity the rules 610 are depicted in a sequential order, the rules 610 may be organized by time received, type, error, event, or the like. Each rule 610 may comprise one or more data blocks. In addition, each rule 610 may be an ODM object. A download module 205 downloads 505 rule 5 610e. In one embodiment, rule 5 610e contains one or more data fields contain values indicating that rule 5 610e should be appended to the rule matrix 605 of an intended storage device 125.

Figure 7:
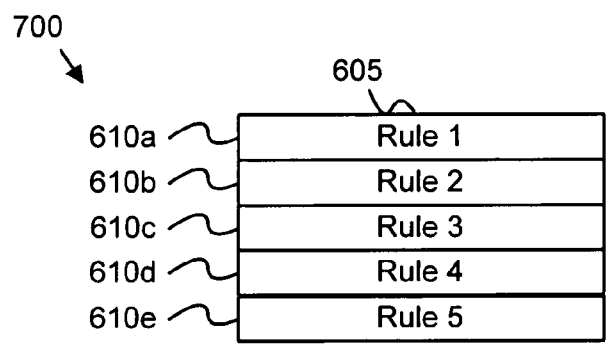
FIG. 7 is a schematic block diagram illustrating one embodiment of an appended rule matrix in accordance with the present invention.

FIG. 7 is a schematic block diagram illustrating one embodiment of an appended rule matrix 700 of the present invention. Rule 5 610e of FIG. 6 is depicted appended to the rule matrix 605 of FIG. 6 after a determination module 210 determined 510 that rule 5 610e was intended for the storage device 125 of the rule matrix 605. A modification module 215 modified 515 the rule matrix 605 by appending the rule 5 610e to the rule matrix 605 as depicted.

Figure 8:
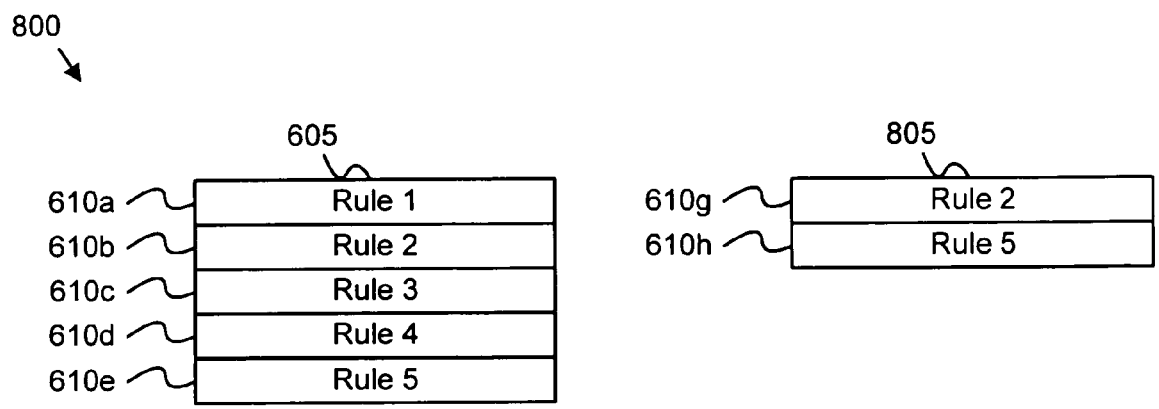
FIG. 8 is a schematic block diagram illustrating removing a rule in accordance with one embodiment of the present invention.

FIG. 8 is a schematic block diagram illustrating one embodiment of removing a rule 800 of the present invention. The rule matrix 605 of FIG. 7 is depicted. The rule matrix 605 resides on a storage device 125 such as the storage device 125 of FIG. 1. A download module 205 downloads 505 rule 2 610g and rule 5 610h. In one embodiment, rule 2 610g and rule 5 610h contain one or more data fields containing values indicating that rule 2 610g and rule 5 610h should be removed from the rule matrix 605 of an intended storage device 125. For example, rules 2 and 5 610g, 610h may include a data field containing a delete data value. The delete data value indicates that all rules identical to rules 2 and 5 610g, 610h should be deleted.

Figure 9:
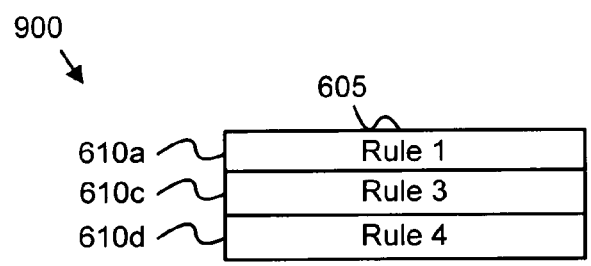
FIG. 9 is a schematic block diagram illustrating one embodiment of rule matrix with a removed rule in accordance with the present invention.

FIG. 9 is a schematic block diagram illustrating one embodiment of rule matrix removal 900 of the present invention. The rule matrix 605 of FIG. 8 is depicted after the determination module 210 determined 510 that rule 2 610g and rule 5 610h of FIG. 8 were intended for the storage device 125 of the rule matrix 605 of FIG. 8. A modification module 215 modified 515 the rule matrix 605 by identifying rule 2 610b and rule 5 610e of the rule matrix as identical to the downloaded rule 2 610g and rule 5 610h. The modification module 215 removed rule 2 610b and rule 5 610e from the rule matrix 605 as depicted.

The present invention automatically maintains a rule matrix by downloading a rule, determining the intended storage device for the rule, and modifying the storage device's rule matrix with the rule. In addition, the present invention maintains a rule matrix with one or more rule types including error rules and deferral rules, and may maintain a plurality of rule matrices. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automatically maintain a rule matrix, the apparatus comprising:
   a download module configured to download a rule regulating error reporting for a storage device, the rule comprising a deferral rule that directs a communication module to defer communication with a service center to align with staffing levels at the service center and an error rule that directs the execution of a data collection process prior to a service call;
   a destination module configured to determine an intended storage device regulated by the rule;
   a modification module configured to modify a rule matrix of the intended storage device using the rule; and
   the communication module configured to communicate with the service center responsive to a storage device error condition and the service call.

2. The apparatus of claim 1, wherein the modification module is further configured to modify the rule matrix by appending the rule to the rule matrix.

3. The apparatus of claim 1, wherein the modification module is further configured to modify the rule matrix by removing the rule from the rule matrix.

4. The apparatus of claim 1, wherein the rule comprises an Object Data Manager object.

5. A system to automatically maintain a rule matrix, the system comprising:
   a storage device configured to store and retrieve data;
   a controller configured to manage the storage device, the controller comprising
      a download module configured to download a rule regulating
      error reporting for the storage device, the rule comprising a deferral rule that directs a communication module to defer communication with a service center to align with staffing levels at the service center and an error rule that directs the execution of a data collection process prior to a service call;
      a destination module configured to determine an intended storage device regulated by the rule;
      a modification module configured to modify a rule matrix of the intended storage device using the rule; and
      the communication module configured to communicate with the service center responsive to a storage device error condition and the service call.

6. The system of claim 5, wherein the modification module is further configured to modify the rule matrix by appending the rule to the rule matrix.

7. The system of claim 5, wherein the modification module is further configured to modify the rule matrix by removing the rule from the rule matrix.

8. A program of executable code stored on a semiconductor device and executed by a processor to perform operations to automatically maintain a rule matrix, the operations comprising:
   downloading a rule configured to regulate error reporting for a storage device, the rule comprising a deferral rule that directs a deferral of communication with a service center to align with staffing levels at the service center and an error rule that directs the execution of a data collection process prior to a service call;
   determining an intended storage device regulated by the rule;
   modifying a rule matrix of the intended storage device using the rule; and
   communicating with the service center responsive to a storage device error condition and the service call.

9. The program of claim 8, further comprising an operation to modify the rule matrix by appending the rule to the rule matrix.

10. The program of claim 8, further comprising an operation to modify the rule matrix by removing the rule from the rule matrix.

11. The program of claim 8, wherein the rule comprises an Object Data Manager object.

* * * * *